Dec. 9, 1947. P. E. HAWKINSON 2,432,154
BUFFER HEAD
Filed Dec. 3, 1945

Inventor
Paul E. Hawkinson
By his Attorneys

Patented Dec. 9, 1947

2,432,154

UNITED STATES PATENT OFFICE 2,432,154

BUFFER HEAD

Paul E. Hawkinson, Minneapolis, Minn., assignor to Paul E. Hawkinson Company, Minneapolis, Minn., a corporation of Minnesota Application December 3, 1945, Serial No. 632,509

1 Claim. (Cl. 29—78)

My invention relates to novel buffing heads of the type which are particularly adapted for use in the repairing of pneumatic tires.

One of the objects of my invention is the provision of quick cutting inexpensive buffing bands, preferably made out of stamped sheet metal.

Another object of my invention is the provision of a head for quickly mounting and dismounting said endless stamped sheet metal buffing band and to this end I have provided an internally threaded hub adapted to be mounted on a rotary shaft, usually of the flexible type, which has a pair of side plates slidably mounted thereon. Operatively mounted on the hub and intermediate the clamping plates I provide a rubber-like ring. The stamped sheet metal buffing band is adapted to slide axially over the clamping plates and frictionally engage and circumferentially overlie the rubber-like ring. In this manner when the clamping plates are squeezed together by screw or other means, the rubber-like ring is compressed axially and expanded radially into tight contact with the buffing band so that when the hub is rotated the side plates, rubber-like ring and buffing band rotate with it.

The above and other objects will become apparent from the following specification, attached drawings and appended claim.

Referring to the drawings wherein like characters indicate like parts throughout the several views.

Figure 1:
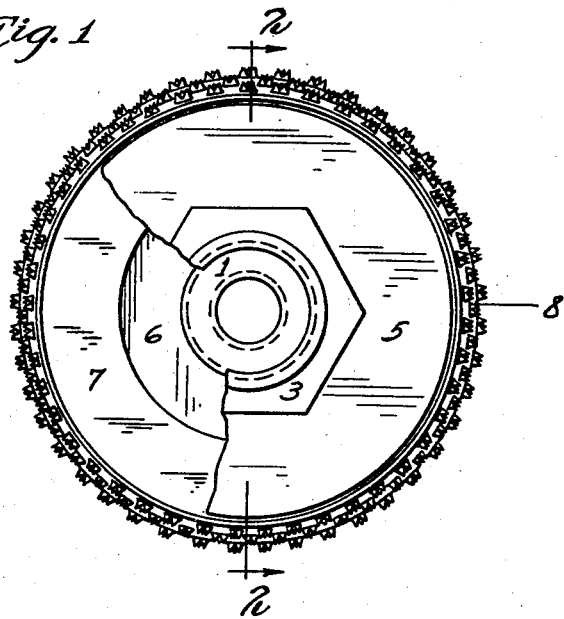
Fig. 1 is a side elevation.

Referring more particularly to the drawings, the numeral 1 indicates an internally threaded cylindrical hub. It will be observed that the internal bores in the opposite ends of hub 1 are of different diameter in order that the same may be adapted to different size shafts. Hub 1 is provided with an integrally formed enlarged flange 2 on one end and with a screw-threaded nut 3 on the other. A pair of clamping plates 4 and 5, preferably in the form of circular washers, are slidably mounted on said hub intermediate flange 2 and nut 3. A bushing 6 is slidably mounted on said hub 1 intermediate clamping plates 4 and 5. A rubber-like ring 7 is slidably mounted on bushing 6 intermediate side plates 4 and 5. It will be observed that rubber-like ring 7 is of a somewhat greater width than bushing 6. While I have shown side plate 4 and bushing 6 as being slidably mounted on hub 1, it should be understood that both thereof could be formed integrally with hub 1.

Figure 2:
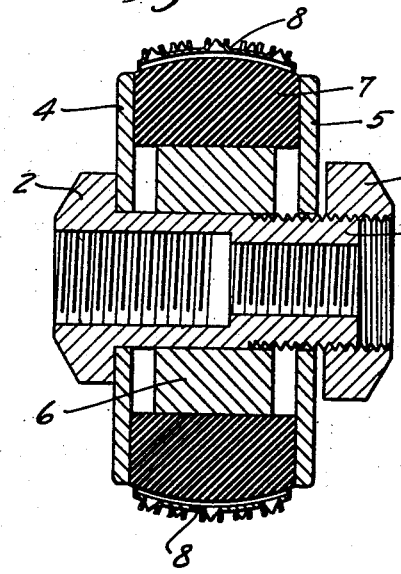
Fig. 2 is a vertical axial section taken on the line 2—2 of Fig. 1.

An endless buffing band 8, preferably of the punched sheet metal type, and of greater diameter than side plates 4 and 5, is slidable thereover and frictionally engages and circumferentially overlies the rubber-like ring 7. It will be observed that the diameter of rubber-like ring 7 is preferably, and as shown, slightly greater than that of the side plates 4 and 5, even when in the natural uncompressed position, illustrated in Fig. 2. It will also be observed that the peripheral face of the rubber-like ring is slightly arcuate in cross section, its maximum diameter being toward the center. This is also preferably true of buffing band 8. The arcuate shape of the rubber-like ring is important in that it greatly facilitates the temporary positioning of the buffing band 8 thereon prior to squeezing of the side plates 4 and 5 together. On the other hand, the arcuate shape of the buffing band greatly aids in the clamping and centering of the band during the clamping squeezing process and also prevents lateral shifting of the band during use.

Figure 3:
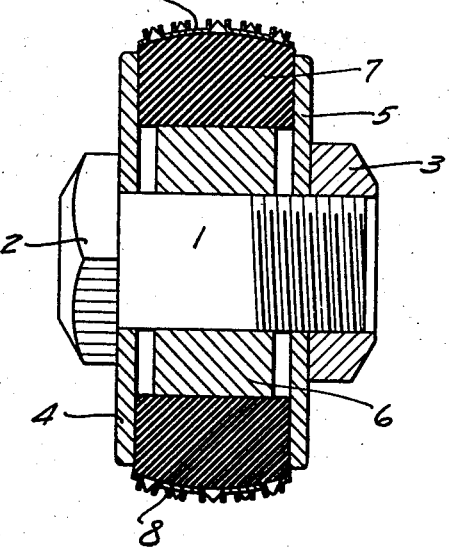
Fig. 3 is similar to Fig. 2 but showing the clamping plates forced together so as to expand the rubber-like ring into contact with the buffing band.

It is obvious that in order to bring the rubber-like ring into tight contact with the band 8, as illustrated in Fig. 3, so that the hub 2, side plates 4 and 5, rubber-like ring 7 and buffing band 8 may revolve as a unit, it is only necessary to screw nut 3 inwardly, thereby compressing rubber-like ring 7 axially, which tends at the same time to expand it radially into tight contact with band 8.

What I claim is:

In a device of the kind described, a hollow hub provided with internal screw threads extending inwardly from each end thereof, a solid bushing embracing said hub, spaced clamping plates supported on the hub at either side of said bushing for relative movement axially thereof and having parallel inner walls, clamping means on the hub engageable with one of said clamping plates for moving it towards the other clamping plate, a rubber-like ring having a cylindrical inner wall supported on and embracing the periphery of said bushing having plane parallel side walls engageable by the parallel inner walls of said clamping plates and having an outer peripheral wall of convex formation in cross section of the ring wholly disposed radially outward of the clamping plates, and an endless metallic buffing band of arcuate form in cross section in general conformity with said outer peripheral wall of the ring, the inner wall of the band being of slightly greater diameter than the corresponding normal diameter of the outer wall of the ring whereby the band may readily be placed on the ring and the inner wall thereof centered and tightly gripped by the expanded outer wall of the ring upon lateral compression of the side walls thereof by said clamping plates as effected by said clamping means.

PAUL E. HAWKINSON.

REFERENCES CITED

The following references are of record in the file of this patent:

UNITED STATES PATENTS

| Number | Name | Date |
| --- | --- | --- |
| 474,680 | Niermann | May 10, 1892 |
| 1,563,294 | Sattel | Nov. 24, 1925 |
| 1,906,190 | Tautz | Apr. 25, 1933 |
| 2,140,831 | Ecklund et al. | Dec. 20, 1938 |
| 2,259,820 | James | Oct. 21, 1941 |
| 2,300,861 | Bacon, Jr. | Nov. 3, 1942 |
| 2,350,019 | Dexter | May 30, 1944 |
| 2,382,209 | Crocker | Aug. 14, 1945 |